United States Patent
Chowdhary et al.

(10) Patent No.: US 9,870,535 B2
(45) Date of Patent: Jan. 16, 2018

(54) METHOD AND APPARATUS FOR DETERMINING PROBABILISTIC CONTEXT AWARENESS OF A MOBILE DEVICE USER USING A SINGLE SENSOR AND/OR MULTI-SENSOR DATA FUSION

(71) Applicants: STMicroelectronics, Inc., Coppell, TX (US); STMicroelectronics International N.V., Amsterdam (NL)

(72) Inventors: Mahesh Chowdhary, San Jose, CA (US); Arun Kumar, New Delhi (IN); Ghanapriya Singh, New Delhi (IN); Kashif R. J. Meer, New Delhi (IN); Indra Narayan Kar, New Delhi (IN); Rajendar Bahl, New Delhi (IN)

(73) Assignees: STMicroelectronics, Inc., Coppell, TX (US); STMicroelectronics International N.V., Schiphol (NL)

( * ) Notice: Subject to any disclaimer, the term of this patent is extended or adjusted under 35 U.S.C. 154(b) by 0 days.

(21) Appl. No.: 15/074,188

(22) Filed: Mar. 18, 2016

(65) Prior Publication Data
US 2016/0253594 A1    Sep. 1, 2016

Related U.S. Application Data

(63) Continuation-in-part of application No. 14/749,118, filed on Jun. 24, 2015.
(Continued)

(51) Int. Cl.
*G01D 1/00* (2006.01)
*G06F 15/00* (2006.01)
(Continued)

(52) U.S. Cl.
CPC ....... *G06N 7/005* (2013.01); *G06F 17/30477* (2013.01)

(58) Field of Classification Search
CPC ...... G06N 99/005; G06N 7/005; G06N 5/022; G06N 5/04; G06N 3/006; G06N 3/08;
(Continued)

(56) References Cited

U.S. PATENT DOCUMENTS

| 2011/0215952 A1 | 9/2011 | Aria et al. | |
| 2014/0201126 A1* | 7/2014 | Zadeh | G06K 9/627 706/52 |

* cited by examiner

*Primary Examiner* — Roy Y Yi
(74) *Attorney, Agent, or Firm* — Gardere Wynne Sewell LLP

(57) ABSTRACT

An electronic device described herein includes a sensing unit having at least one sensor to acquire sensing data. An associated computing device extracts sensor specific features from the sensing data, and generates a motion activity vector, a voice activity vector, and a spatial environment vector as a function of the sensor specific features. The motion activity vector, voice activity vector, and spatial environment vector are processed to determine a base level context of the electronic device relative to its surroundings, with the base level context having aspects each based on the motion activity vector, voice activity vector, and spatial environment vector. Meta level context of the electronic device relative to its surroundings is determined as a function of the base level context, with the meta level context being at least one inference made from at least two aspects of the plurality of aspects of the base level context.

17 Claims, 13 Drawing Sheets

---

Method 1: Composite feature vector $Z^k$ from multiple sensors given as input to probabilistic classifier, where $Z^k = \{Z_1, ..., Z_k\}'$, and $Z_1, ..., Z_k$ are the feature vectors from sensor No. 1 to k Method 2: Suppose $Z^k = \{Z_1, ..., Z_k\}$, and $Z_i$ is the feature vector of sensor number i. Assuming $Z_i$ and $Z_j$ are independent given the underlying class $P(Z_i, Z_j \mid Class^L) = P(Z_i \mid Class^L).P(Z_j \mid Class^L)$. Perform multi-sensor fusion using Bayes' theorem:
$P(Class^L \mid Z^k) = P(Z^k \mid Class^L).P(Class^L) / P(Z^k)$ Fusion of data from multiple sources Related U.S. Application Data

(60) Provisional application No. 62/121,104, filed on Feb. 26, 2015.

(51) Int. Cl.
*G06M 11/04* (2006.01)
*G06N 7/00* (2006.01)
*G06F 17/30* (2006.01)

(58) Field of Classification Search
CPC ............. G06F 3/04815; G06F 3/04817; G06F 3/0482; G06F 3/0605; G06F 3/0614; G06F 3/0616; G06F 3/0619; G06F 3/0631; G06F 3/064; G06F 3/067; G06F 3/0683; G06F 3/14; G06F 7/02; G06F 8/20; G06F 9/30
See application file for complete search history.

| | Walk | Cycling | Stationary | Stairs Up | Stairs Down | Jogging | Drive | Elevators Up | Elevators Down |
|---|---|---|---|---|---|---|---|---|---|
| Walk | 93.68 | 0.57 | 0.00 | 1.42 | 3.40 | 0.85 | 0.00 | 0.00 | 0.00 |
| Cycling | 2.92 | 88.98 | 3.96 | 2.17 | 0.85 | 0.16 | 1.40 | 0.00 | 0.47 |
| Stationary | 0.00 | 0.77 | 98.72 | 0.00 | 0.00 | 0.00 | 0.51 | 0.00 | 0.00 |
| Stairs Up | 0.00 | 2.11 | 0.00 | 97.89 | 0.00 | 0.00 | 0.00 | 0.00 | 0.00 |
| Stairs Down | 0.63 | 0.00 | 0.00 | 0.00 | 99.37 | 0.00 | 0.00 | 0.00 | 0.00 |
| Jogging | 0.00 | 0.00 | 0.00 | 0.83 | 0.00 | 99.17 | 0.00 | 0.00 | 0.00 |
| Driving | 0.00 | 1.84 | 10.92 | 2.86 | 1.02 | 0.00 | 82.86 | 0.41 | 0.20 |
| Elevators Up | 0.00 | 0.00 | 0.57 | 0.57 | 0.00 | 0.00 | 0.57 | 98.29 | 0.00 |
| Elevators Down | 0.00 | 0.61 | 0.00 | 0.00 | 1.22 | 0.00 | 0.61 | 0.00 | 97.56 |

FIG. 11

METHOD AND APPARATUS FOR DETERMINING PROBABILISTIC CONTEXT AWARENESS OF A MOBILE DEVICE USER USING A SINGLE SENSOR AND/OR MULTI-SENSOR DATA FUSION

RELATED APPLICATION

This application claims the benefit and priority of U.S. App. No. 62/121,104, filed Feb. 26, 2015, and is also a continuation-in-part of U.S. application Ser. No. 14/749,118 filed Jun. 24, 2015, the contents of both of which are hereby incorporated by reference to the maximum extent allowable under the law.

TECHNICAL FIELD

This disclosure relates to field of electronic devices, and, more particularly, to a framework for determining a mobile device user's context based on motion activities, voice activities, and the user's spatial environment, using a single sensor's data and/or multi-sensor data fusion.

BACKGROUND

Mobile and wearable devices such as smartphones, tablets, smart watches, and activity trackers increasingly carry one or more sensors such as accelerometers, gyroscopes, magnetometers, barometers, microphones, and GPS receivers that can be used either singly or jointly to detect a user's context such as motion activities of the user, voice activities of or about the user, and a spatial environment of the user. Previous research work on motion activities has considered the classification of basic locomotion activities of a user such as walking, jogging, and cycling. Voice detection uses microphone recordings to detect human speech from silence in the presence of background noise and is used in applications such as audio conferencing, variable rate speech codecs, speech recognition, and echo cancellation. The detection of a mobile device user's spatial environment from audio recordings has been investigated for determining environment classifications of the user such as in the office, on the street, at a stadium, at the beach etc.

In most context detection tasks, data from one sensor is used. The accelerometer is typically used for motion activity detection while the microphone is used for voice activity detection and spatial environment detection.

These prior art detection methods provide for a deterministic output in the form of a detected class from a set of specific classes for motion activities or acoustic environments, as described above. However, the determination of the user's context using such prior art techniques may not be as accurate as would be ideally desirable, and moreover, does not allow for more complex determinations about the user's context. Consequently, further development in this area is needed.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

An electronic device described herein includes a sensing unit having at least one sensor to acquire sensing data. An associated computing device extracts sensor specific features from the sensing data, and generates a motion activity vector, a voice activity vector, and a spatial environment vector as a function of the sensor specific features. The motion activity vector, voice activity vector, and spatial environment vector are processed to determine a base level context of the electronic device relative to its surroundings, with the base level context having aspects each based on the motion activity vector, voice activity vector, and spatial environment vector. Meta level context of the electronic device relative to its surroundings is determined as a function of the base level context, with the meta level context being at least one inference made from at least two aspects of the plurality of aspects of the base level context.

Another aspect is directed to an electronic device including a printed circuit board (PCB) having at least one conductive trace thereon, and a system on chip (SoC) mounted on the PCB and electrically coupled to the at least one conductive trace. A sensor chip is mounted on the PCB in a spaced apart relation with the SoC and is electrically coupled to the at least one conductive trace such that the sensor chip and SoC are electrically coupled. The sensor chip is configured to acquire sensing data.

The sensor chip may include a micro-electromechanical system (MEMS) sensing unit and an embedded processing node. The embedded processing node may be configured to preprocess the sensing data, extract sensor specific features from the sensing data, and generate a motion activity posteriorgram, a voice activity posteriorgram, and a spatial environment posteriorgram as a function of the sensor specific features. The embedded processing node may further process the motion activity posteriorgram, voice activity posteriorgram, and spatial environment posterior gram so as to determine a base level context of the electronic device relative to its surroundings, with the base level context having a plurality of aspects each based on the motion activity posteriorgram, voice activity posteriorgram, and spatial environment posteriorgram. The processing node may also determine meta level context of the electronic device relative to its surroundings as a function of the base level context and a pattern library stored in the cloud or a local memory, with the meta level context being at least one inference made from at least two aspects of the plurality of aspects of the base level context.

A method aspect includes acquiring sensing data from a sensing unit, extracting sensor specific features from the sensing data, using a computing device, and generating a motion activity vector, a voice activity vector, and a spatial environment vector as a function of the sensor specific features, using the computing device. The method continues with processing the motion activity vector, voice activity vector, and spatial environment vector so as to determine a base level context of the electronic device relative to its surroundings, with the base level context having a plurality of aspects each based on the motion activity vector, voice activity vector, and spatial environment vector, using the computing device. Meta level context of the electronic device relative to its surroundings may be determined as a function of the base level context, with the meta level context being at least one inference made from at least two aspects of the plurality of aspects of the base level context.

BRIEF DESCRIPTION OF THE DRAWINGS

FIG. 11 lists a confusion matrix obtained for the motion activity classes using the probabilistic motion activity posteriorgram output generated using features obtained from accelerometer and barometer data.

DETAILED DESCRIPTION

In the following description, numerous details are set forth to provide an understanding of the present disclosure. It will be understood by those skilled in the art, however, that the embodiments of the present disclosure may be practiced without these details and that numerous variations or modifications from the described embodiments may be possible.

As will be described herein in detail, this disclosure relates to an algorithmic framework for determining a mobile device user's context in the form of motion activities, voice activities, and spatial environment with a single sensor's data and multi-sensor data fusion. In particular, the algorithmic framework provides probabilistic information about motion activities, voice activities, and spatial environment through heterogeneous sensor measurements that may include data from an accelerometer, barometer, gyroscope, and microphone embedded on the mobile device, but is not limited to these sensors. The computational architecture allows the probabilistic outputs to be combined in many ways to infer meta-level context awareness information about the mobile device user.

Figure 1:
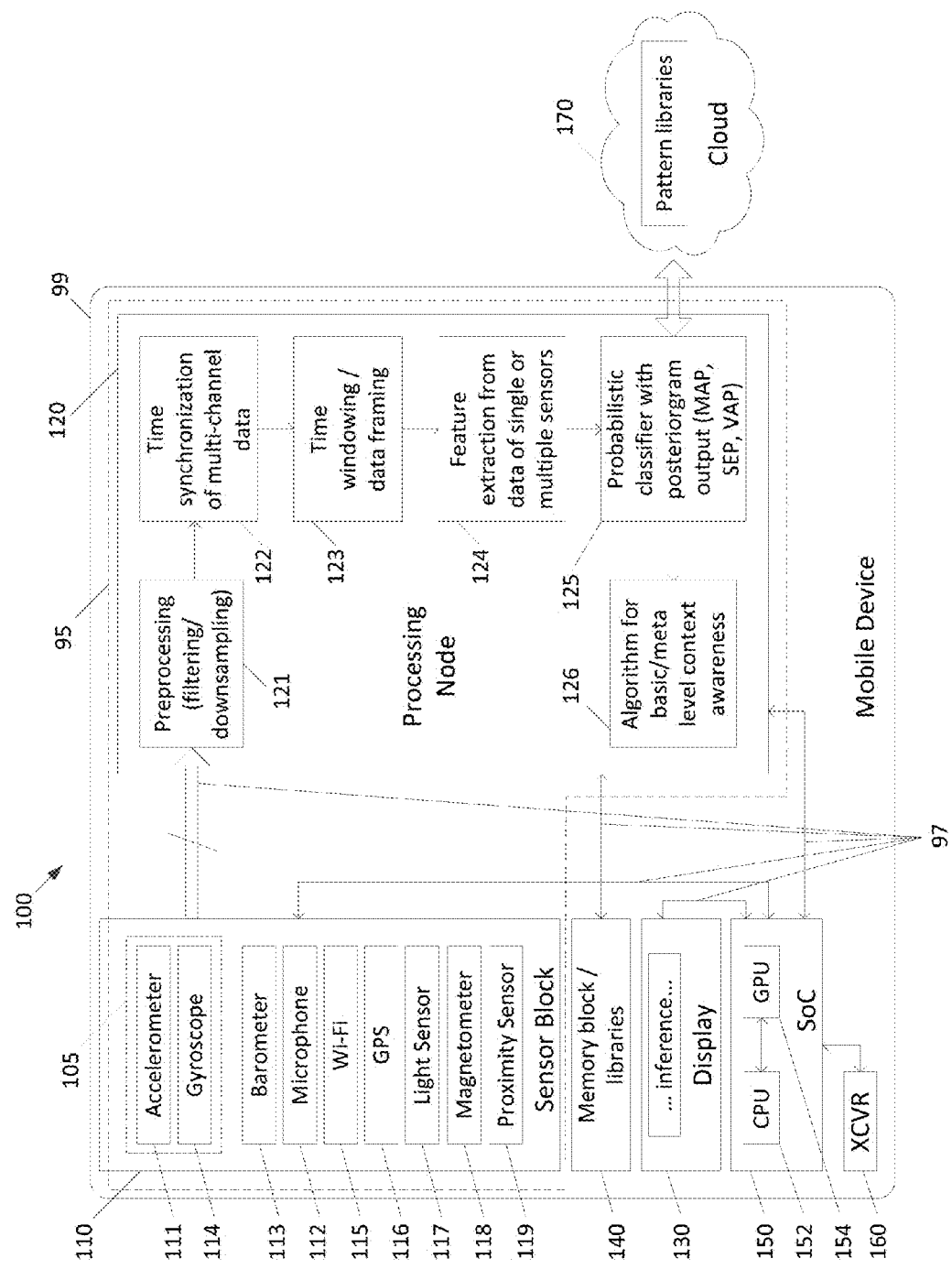
FIG. 1 is a block diagram of an electronic device that is configured to determine contextual awareness of a user of the electronic device in accordance with this disclosure.

With initial reference to FIG. 1, an electronic device 100 is now described. The electronic device 100 may be a smartphone, tablet, smartwatch, activity tracker, or other wearable device. The electronic device 100 includes a printed circuit board (PCB) 99 having various components mounted thereon. Conductive traces 97 printed on the PCB 99 serve to electrically couple the various components together in a desired fashion.

A system on chip (SoC) 150, which comprises a central processing unit (CPU) 152 coupled to a graphics processing unit (GPU) 154, is mounted on the PCB 99. Coupled to the SoC 150 are a memory block 140, an optional transceiver 160 via which the SoC 150 can wirelessly communicate with remote servers over the internet, and a touch sensitive display 130 via which the SoC 150 may display output and receive input. A sensor unit 110 is coupled to the SoC 150, including a tri-axial accelerometer 111 for determining accelerations experienced by the electronic device 110, a microphone 112 used to detect audible noises in the environment, a barometer 113 used to determine the atmospheric pressure in the environment (and thus, an indication of the altitude of the electronic device 100), a tri-axial gyroscope 114 for determining angular rate and subsequently, orientation (roll, pitch or yaw) of the electronic device 100 with respect to the environment, a WiFi 115 transceiver via which the SoC 150 can communicate with remote servers over the internet, a GPS receiver 116 via which the SoC 150 can determine a geospatial location of the electronic device 100, a light sensor 117 for determining the level of ambient light in the environment in which the electronic device 100 resides, a magnetometer 118 used to determine the magnetic field strength in the environment and thereby the orientation of the electronic device 100, and a proximity sensor 119 used to determine proximity of the user with respect to the electronic device 100.

The sensor unit 110 is configurable and is mounted on the PCB 99 spaced apart from the SoC 150, and the various sensors thereof are coupled to the SoC by the conductive traces 97. Some sensors of the sensor unit 110 may form a MEMS sensing unit 105, which can include any sensor capable of being implemented in MEMS, such as the accelerometer 111 and gyroscope 114.

The sensor unit 110 may be formed from discrete components and/or integrated components and/or a combination of discrete components and integrated components, and may be formed as a package. It should be understood that the sensors shown as part of the sensor unit 110 are each optional, and that some of the shown sensors may be used and some of the shown sensors may be omitted.

It should be understood that the configurable sensor unit 110 or MEMS sensing unit 105 is not a portion of the SoC 150, and is a separate and distinct component from the SoC 150. Indeed, the sensor unit 110 or MEMS sensor unit 105 and the SoC 150 may be separate, distinct, mutually exclusive structures or packages mounted on the PCB 99 at different locations and coupled together via the conductive traces 97, as shown. In other applications, the sensor unit 110 or MEMS sensor unit 105 and the SoC 150 may be contained with a single package, or may have any other suitable relation to each other. In addition, in some applications, the sensor unit 110 or MEMS sensor unit 105 and processing node 120 may collectively be considered a sensor chip 95.

The various sensors of the sensor unit 110 acquire signals, perform signal conditioning, and give digitized outputs at different sampling rates. Either a single one of the sensors may be used, or multiple ones of the sensors may be used. Multi-channel digital sensor data from sensors of the sensor unit 110 are passed to the processing node 120. The processing node 120 performs various signal processing tasks. Initially, the preprocessing steps of filtering the multi-channel sensor data and down sampling are done (Block 121), and then time synchronization between the different data channels when sensor data from multiple sensors is used is performed (Block 122). Thereafter the sensor data obtained from a single sensor or multiple sensors is buffered into frames by using overlapping/sliding time-domain windows (Block 123). Sensor specific features are extracted from the data frames and given as input to a probabilistic classifier routine (Block 124).

In the probabilistic classifier routine, a motion activity vector (MAV), a voice activity vector (VAV), and a spatial environment vector (SEV) are generated as a function of the sensor specific features. Thereafter, the vectors are processed to form posteriorgrams from each vector (Block 125). Pattern libraries of the probabilistic classifiers are used for obtaining three posteriorgrams based on the vector and are stored in the memory block 140 or in the cloud 170 accessed through the Internet. Using the pattern libraries, the posteriorgrams of basic level context awareness is obtained for each frame of data that can be used to make inferences about basic level or meta-level context of the electronic device 100 (Block 126). The display 130 may be used to present the inferences and intermediate results as desired.

Thus, a motion activity posteriorgram is generated as a function of the motion activity vector, and represents a probability of each element of the motion activity vector as a function of time. A voice activity posteriorgram is generated as a function of the voice activity vector, and represents a probability of each element of the voice activity vector as a function of time. A spatial environment posteriorgram is generated as a function of the spatial environment vector, and represents a probability of each element of the spatial environment vector as a function of time. A sum of each probability of the motion activity posteriorgram at any given time equals one (i.e. 100%). Similarly, a sum of each probability of the voice activity posteriorgram at any given time equals one, and a sum of each probability of the spatial environment posteriorgram at any given time equals one.

The base level context has a plurality of aspects each based on the motion activity vector, voice activity vector, and spatial environment vector. Each aspect of the base level context based on the motion activity vector is mutually exclusive of one another, each aspect of the base level context based on the voice activity vector is mutually exclusive of one another, and each aspect of the base level context based on the spatial environment vector is mutually exclusive of one another.

One of the aspects of the base level context is a mode of locomotion of a user carrying the electronic device. In addition, one of the aspects of the base level context is a nature of biologically generated sounds within audible distance of the user. Additionally, one of the aspects of the base level context is a nature of physical space around the user.

Examples of classes of mode of locomotion, the nature of biologically generated sounds, and the nature of the physical space will now be given, although it should be understood that this disclosure contemplates, is intended to encompass, any such classes.

The various classes of mode of locomotion may include the user being stationary, walking, going up stairs, going down stairs, jogging, cycling, climbing, using a wheelchair, and riding in or on a vehicle. The various classes of the determined nature of the biologically generated sounds may include a telephone conversation engaged in by the user, a multiple party conversation engaged in by the user, the user speaking, another party speaking, background conversation occurring around the user, and an animal making sounds.

The various classes of the nature of the physical space around the user may include an office environment, a home environment, a shopping mall environment, a street environment, a stadium environment, a restaurant environment, a bar environment, a beach environment, a nature environment, a temperature of the physical space, a barometric pressure of the physical space, and a humidity of the physical space.

Each vector has a "none of these" class representing the remaining classes of each vector that are not explicitly incorporated as elements. This allows the sum total of probability of the elements of a vector to be equal to one, that is mathematically relevant. Also, this makes the vector representation flexible so that new classes can be explicitly incorporated in the respective vectors as desired, and such would simply change the constitution of the "none of these" class of that vector.

Meta-level contexts represent inferences made from combinations of the probabilities of the classes of two or more posteriograms. As an example, a meta-level context may be that a user of the electronic device 100 is walking in a shopping mall, or is engaged in a telephone conversation in an office.

The processing node 120 may pass the determined basic level and meta-level contexts to the SoC 150, which may perform at least one contextual function of the electronic device 100 as a function of the basic level context or meta-level context of the electronic device.

Figure 3:
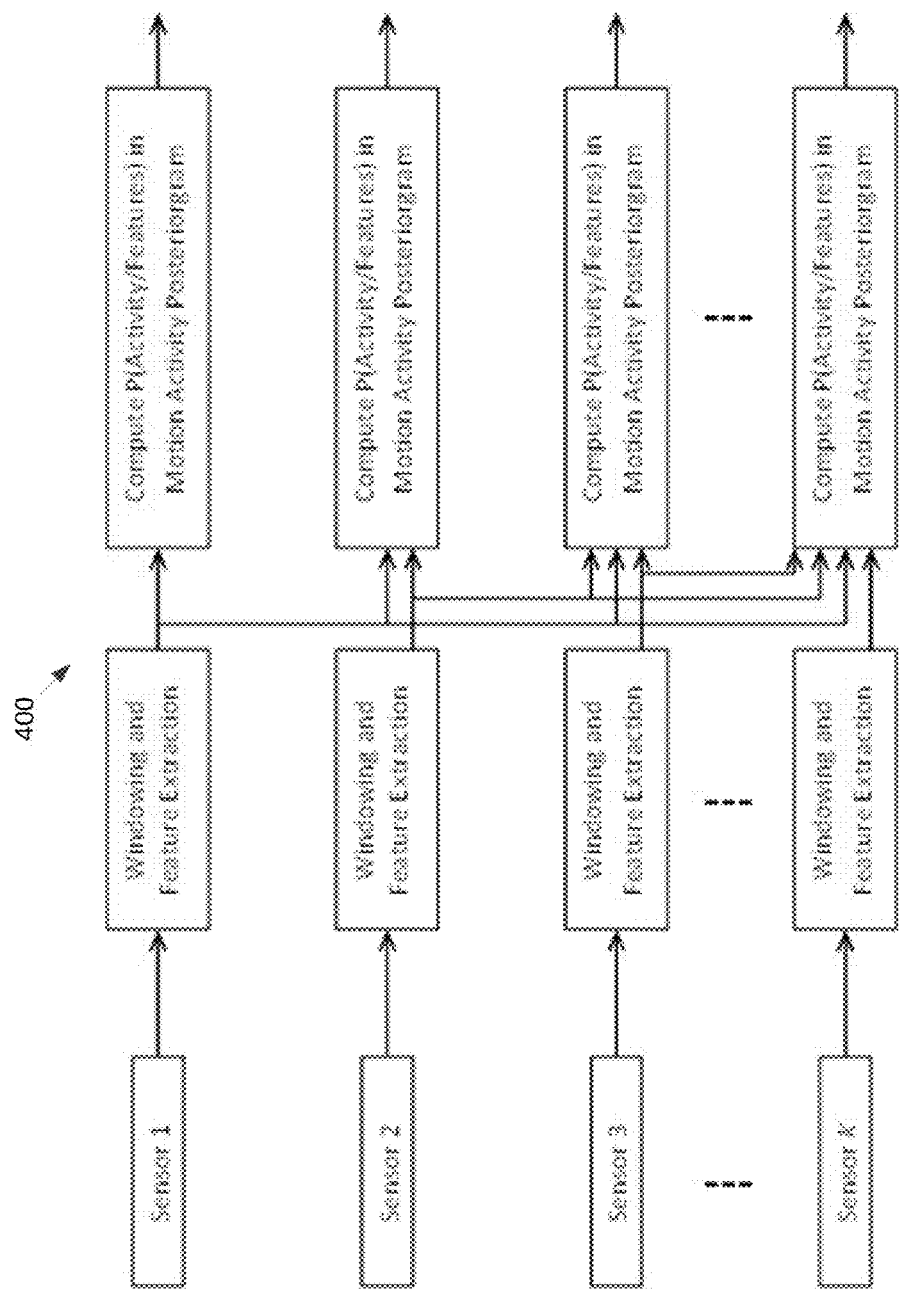
FIG. 3 shows the basic level representation of the contextual awareness of the mobile device user, as determined by the electronic device of FIG. 1, in terms of information about activity, voice, and environment classes grouped into three independent vector and meta-level contextual awareness inferred from this information.

FIG. 3 shows that the basic level context awareness is derived from the time-dependent information about the activity/environment classes in each of the three vectors. The meta-level context awareness is derived from the time-stamped information available from one or more of these basic level vectors and information stored in the mobile device memory 140 or the cloud 170, such as pattern libraries and databases. The desirable form to represent this information for usefulness in application development related to basic level and meta-level context awareness is presented below.

The method to represent the information is in the form of the probability of the classes of a vector (motion activity, voice activity, and spatial environment) as function of time, given the observations from one sensor or multiple sensors. This general representation of information can be used to solve several application problems such as the detection of the likely event from each vector in the time frame. These can be estimated as a posteriori probabilities of each element of the MAV, VAV, and SEV vectors at a given time conditioned on the "observations" that are the features derived from the sensor data recordings. The corresponding vectors of probability values are the respective "posteriograms", i.e. Motion Activity Posteriorgram (MAP), Voice Activity Posteriorgram (VAP), and Spatial Environment Posteriorgram (SEP) that are the processed outputs of the basic level context awareness information.

Figure 4:
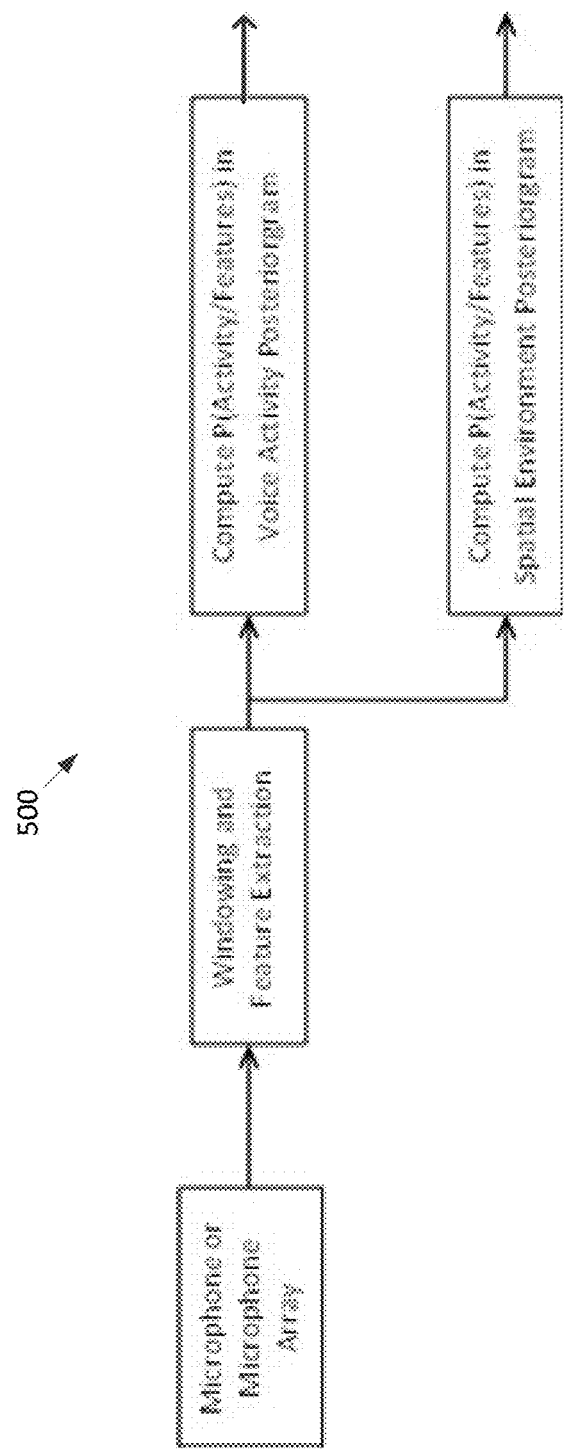
FIG. 4 depicts a motion activity posteriorgram generated as a function of the motion activity vector of FIG. 3.

FIG. 4 shows the MAP as comprising of the probability of the elements of the MAV as a function of time, estimated from features derived from time-windowed observation data. The probability of the motion activity classes is estimated from the time-windowed data obtained from one or more of the various sensors. Some of the models that can be used are i) Hidden Markov Models (HMM), ii) Gaussian Mixture Models (GMM), iii) Artificial Neural Networks (ANN) with probabilistic output for each class, and iv) Multi-class probabilistic Support Vector Machines (SVM) with Directed Acyclic Graph (DAG) or Maximum Wins Voting (MWV). The model parameters are trained using supervised learning from a training database comprising of annotated data from all the sensors to be used, for each motion activity class.

The number of sensors used for obtaining the MAP depends on factors such as the number of available sensors on the mobile device 100, energy consumption constraints for the task, the accuracy of the estimation etc. When more than one sensor is used, different methods can be used to estimate the MAP. A particularly useful to fuse the data obtained from up to K different sensors to estimate the MAP is shown in FIG. 4. In this method, the sensor specific features are extracted from time-windowed data from the respective sensors and the features from the sensors are used to obtain the MAP.

Figure 5:
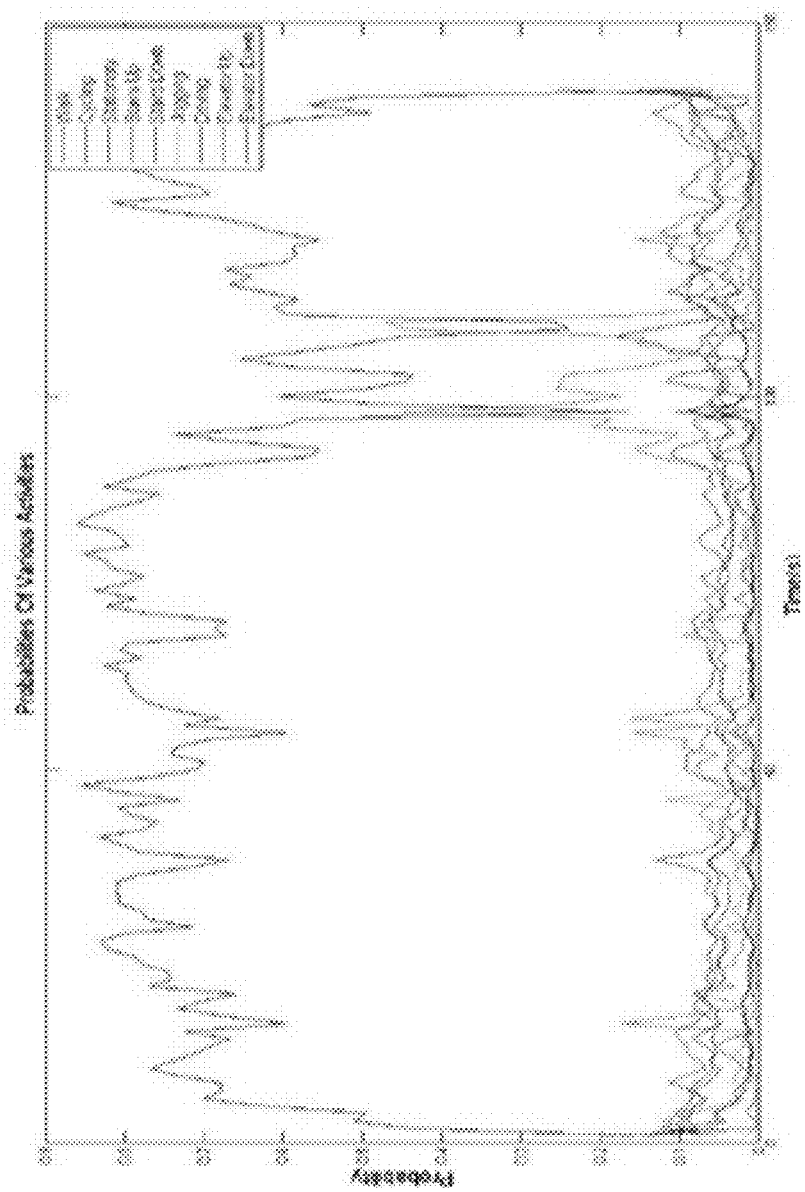
FIG. 5 depicts a voice activity posteriorgram generated as a function of the voice activity vector of FIG. 3.

FIG. 5 shows the VAP and SEP as comprising of the probability of the elements of the VAV and SEV respectively as a function of time, estimated from features derived from time-windowed observation data received from the microphone 112, which may be a beamformed output from an array of such microphones. As for the MAP, the probability is obtained from models for each activity such as HMM, GMM, ANN with probabilistic output for each class, and a multi-class probabilistic SVM with DAG or MWV. The model parameters are trained using supervised learning from a training database comprised of annotated data from all the sensors to be used, for each motion activity class.

Figure 6:
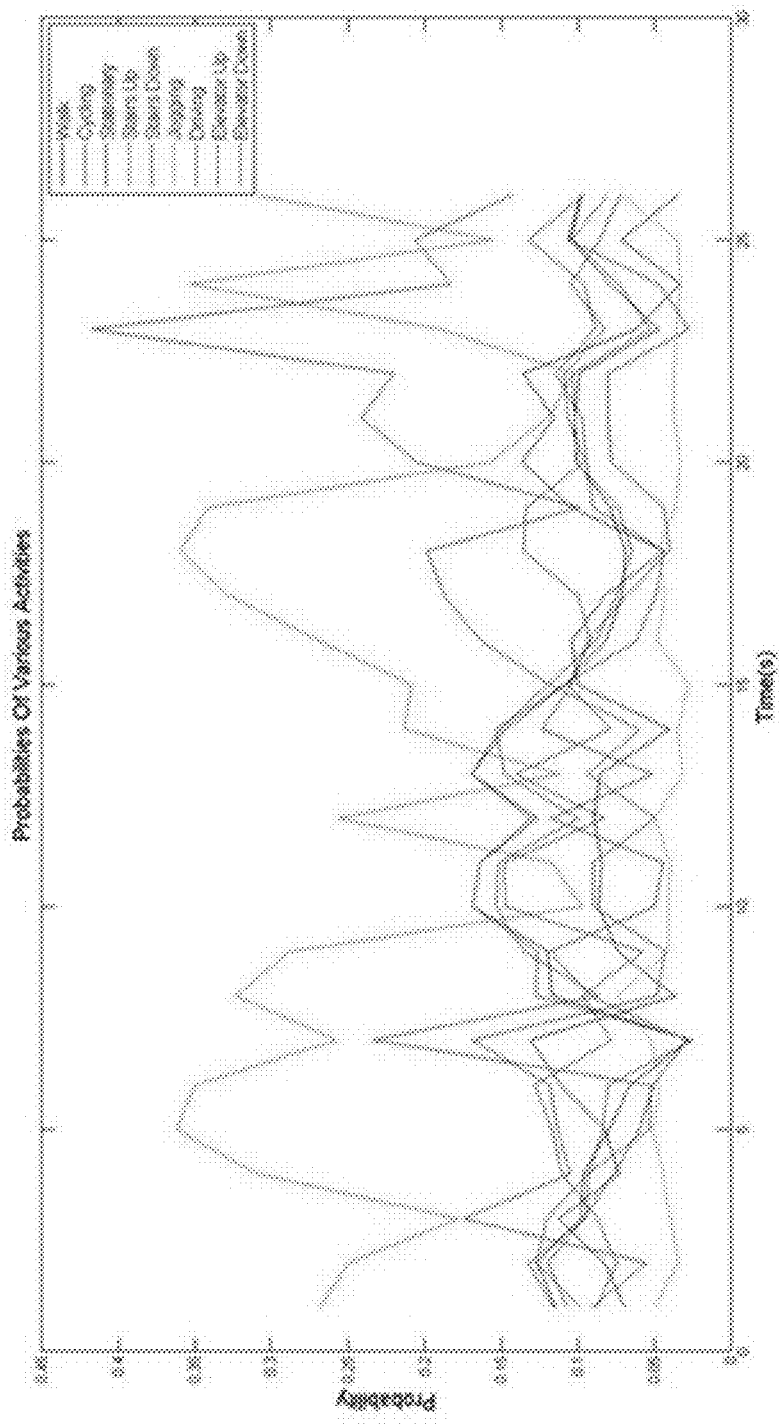
FIG. 6 is a time evolution graph of the motion activity posteriorgram generated using accelerator data for the activity classified as walking.

The MAP for the motion activity of "walking" for time duration of 150 seconds based on the tri-axial accelerometer data is shown in FIG. 6. The tri-axial accelerometer data is sampled at 50 Hz and time-windowed data frame of five seconds are extracted. The successive frames are obtained by shifting the time-windows by two seconds. The magnitude of the three-channel data is used to extract 17-dimensional features per frame. These features include the maxima, minima, mean, root-mean-square, three cumulative features, and $10^{th}$ order linear prediction coefficients. The probability of each activity in a frame is estimated from multi-class probabilistic SVM with DAG. The multi-class probabilistic SVM-DAG model for the MAP graph in FIG. 6 is trained from tri-axial accelerometer data using supervised learning from a training database comprised of time-synchronized multi-sensor data from the tri-axial accelerometer 111, barometer 113, tri-axial gyroscope 114, microphone 112, and tri-axial magnetometer 118, for the motion activities in the MAV.

The time-evolution of the posteriorgram information, as illustrated for the MAP in FIG. 6, is a general representation method for the context awareness information at the basic level. It provides the probability of the classes in the activity/environment vector at a given time, and shows its evolution over time. The following salient features of this representation format are relevant:

At any given time, the sum of probability of all the classes is equal to one; and At any given time, the activity/environment classification can be made from the respective posteriorgram in favor of the class with the maximum probability providing a hard-decision.

The "confidence" in the classification result can be obtained from different measures such as the difference in the maximum probability value and the second highest probability value, etc. The larger the difference between the two probability values, greater shall be the confidence in the accuracy of the decoded class.

It can be observed from FIG. 6 that the probability of walking is the highest compared to the probability of all the other motion activities, which leads to a correct classification at almost all the time instants in the graph. The classification result is erroneous in two small time intervals where the correct activity is misclassified as "stairs up".

Figure 7:
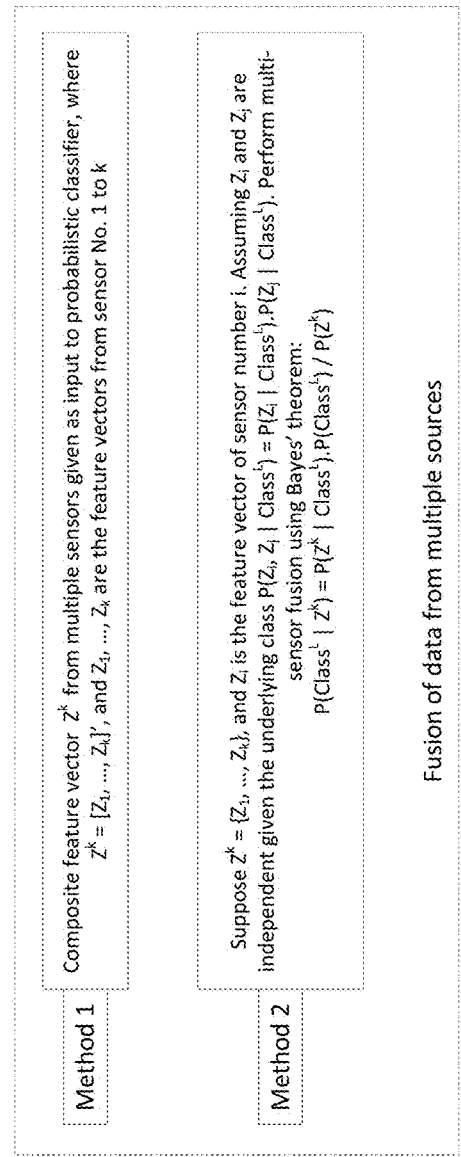
FIG. 7 is a time evolution graph of the motion activity posteriorgram generated using accelerometer for the activity classified as going upstairs.

Another illustration of the time-evolution of the MAP for the motion activity of "going upstairs" for time duration of 30 seconds based on the tri-axial accelerometer data is shown in FIG. 7. It can be seen that the maximum probability class at each time instant varies between "going upstairs", "walking", and some other motion activities. Thus, the decoded motion activity will be erroneous at those time instants where the "going upstairs" class does not have the maximum probability. Also, the maximum probability at each time instant is lower than the "walking" activity illustrated in the MAP of FIG. 6 and closer to the next highest probability. It can be inferred from this that the "confidence" in the accuracy of the decoded class is lower than the "walking" activity case of FIG. 6.

Figure 8:
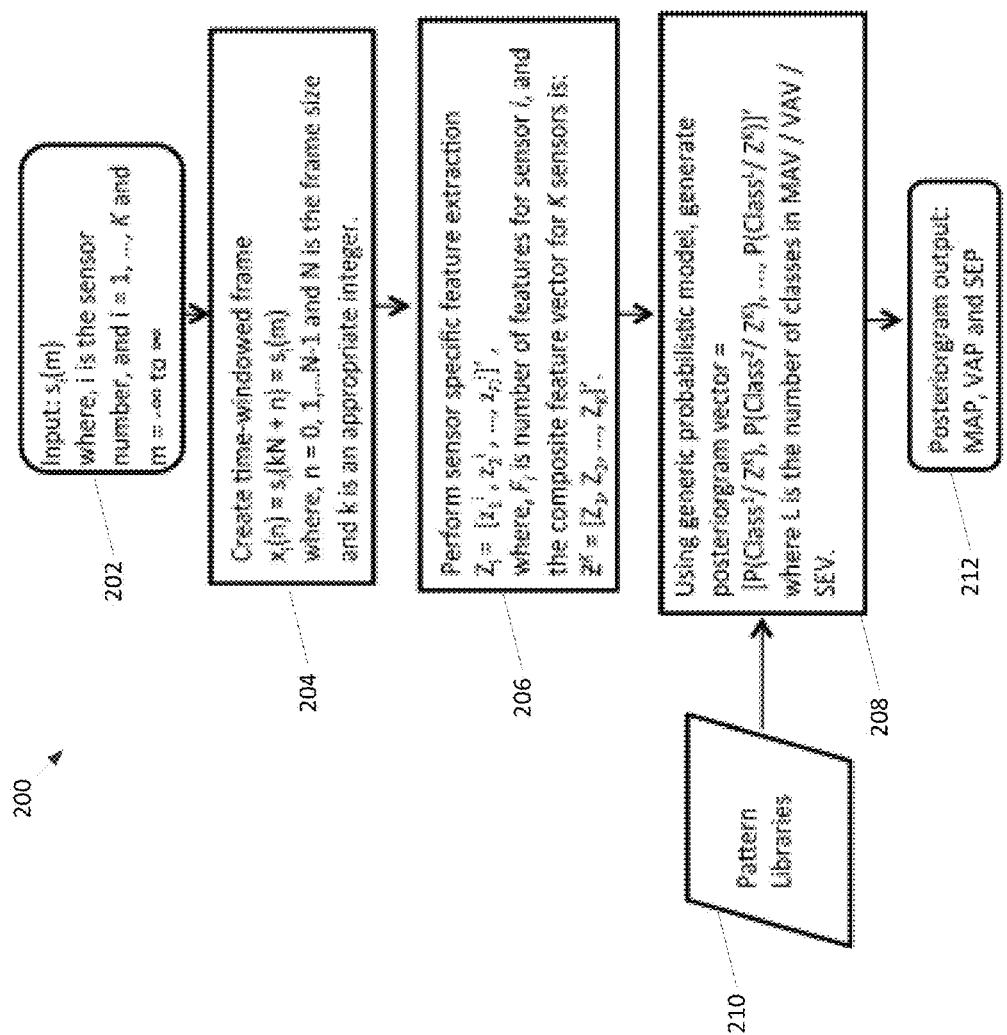
FIG. 8 shows two methods of data fusion from multiple sensors for determining probabilistic context awareness.

FIG. 8 gives two methods of data fusion from multiple sensors. The first involves concatenating the features obtained from each sensor to form a composite feature vector. This feature vector is then given as input to the probabilistic classifier. The second method is based on Bayesian theory. Suppose the observation $Z^K = \{Z_1, \ldots, Z_K\}$, where $Z_i$ is the feature vector of sensor number i. The Bayesian theorem takes into consideration that given a particular class, the information acquired from the feature vector $Z_i$ of sensor $S_i$ is independent from the information obtained from the feature vector $Z_j$ of sensor $S_j$. That is, $P(Z_i, Z_j | Class^L) = P(Z_i | Class^L) \cdot P(Z_j | Class^L)$, that gives the joint probability of the feature vectors from the multiple sensors given the class. Bayes theorem is then used to perform data fusion from multiple sensors to obtain the posteriorgram.

Figure 2:
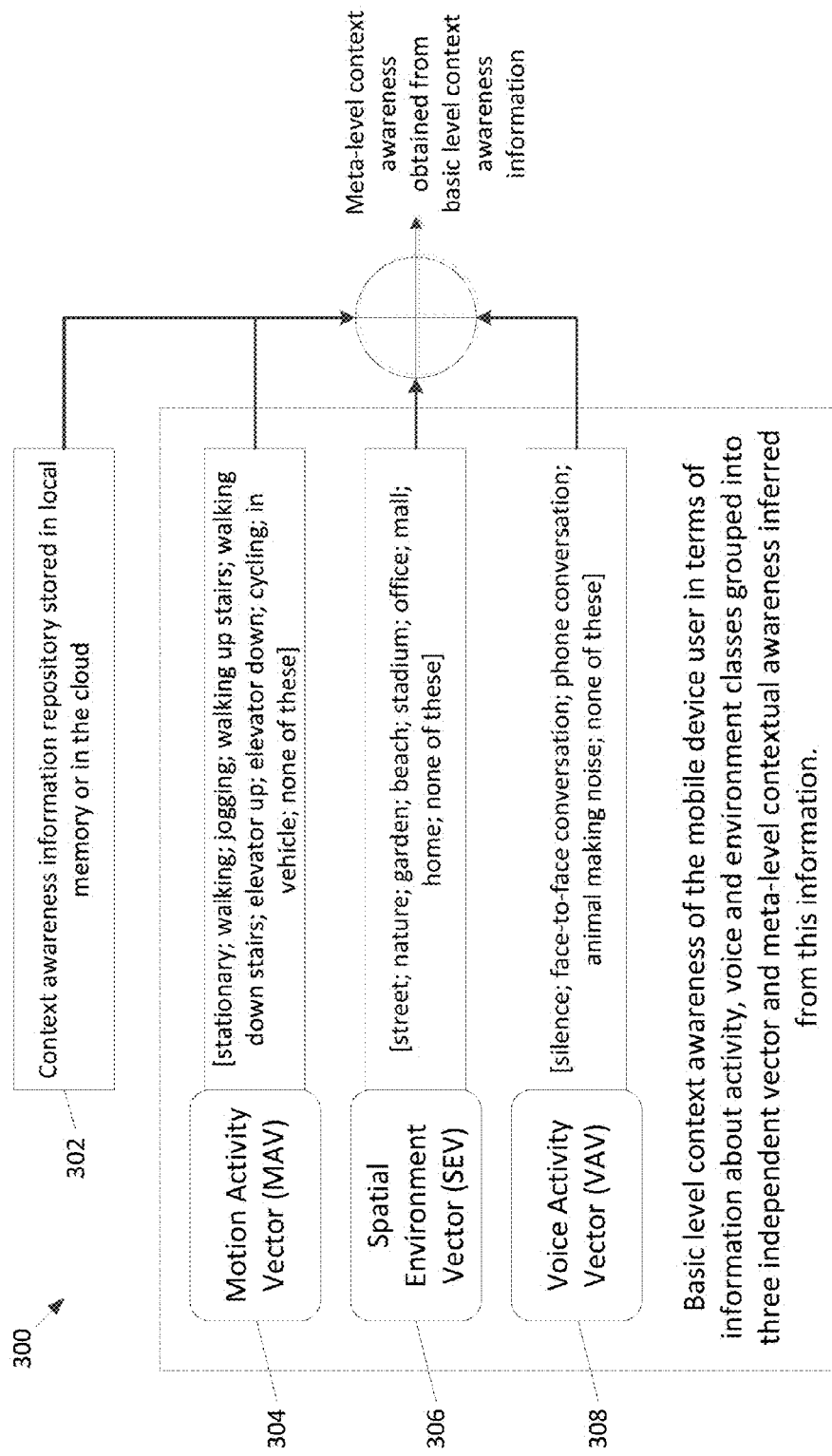
FIG. 2 is a flowchart of a method for obtaining a posterior estimate of probabilities of a basic level representation of contextual awareness of a user of the electronic device of FIG. 1.

FIG. 2 depicts the flowchart of a method for determining the probabilistic context awareness of a mobile device user with a single sensor and multi-sensor data fusion. Let $S_i$ denote the $i^{th}$ sensor, where i=1, 2, ... K, and K is the total number of sensors being used (Block 202). The sensor provides input data $s_i(m)$, where, i is the sensor number from 1 to K, and m is the discrete-time index. The preprocessed time-aligned data $s_i(m)$ is segmented into frames $x_i(n)$ of fixed duration (Block 204).

Thereafter, sensor specific features are extracted and grouped into vectors (Block 206). Let $z_j^i$ be the feature f which is extracted from data $x_i(n)$ of the $i^{th}$ sensor. The composite feature vector is $Z_i$ given by $Z_i = [z_1^i, z_2^i, \ldots, z_{Fi}^i]'$. The composite feature vector for n sensors is denoted by $\mathbb{Z}^K = [Z_1, Z_2, \ldots, Z_k]'$. For basic level context detection, the following features are extracted.

i. MAV:

a. Accelerometer: the maxima, minima, mean, root-mean-square, 3 cumulative features, and $10^{th}$ order linear prediction coefficients.

The three cumulative features are the following:

1. Mean Minima: defined as the mean of first 15% of $x_i(n)$.

2. Mean Middle: defined as the mean of $x_i(n)$ between 30% to 40%.

3. Mean Maxima: is defined as the mean of $x_i(n)$ between 95% to 100%.

b. Pressure Sensor: the maxima, minima, mean, slope and $6^{th}$ order linear prediction coefficients.

c. Gyroscope: the maxima, minima, mean, root-mean-square, 3 cumulative features, and $10^{th}$ order linear prediction coefficients d. Microphone: $10^{th}$ order linear prediction coefficients, Zero crossing rate and short time energy that are concatenated.

ii. VAV and SEV:

a. Microphone: 13 Mel Frequency Cepstral Coefficients (MFCCs), 13 delta MFCCs and 13 double delta MFCCs.

b. Microphone array: 13 MFCCs, 13 delta MFCCs and 13 double delta MFCCs.

The feature vectors are given as input to the probabilistic classifier such as the multi-class probabilistic SVM-DAG (Block 208). The outputs obtained are the respective posteriorgrams viz. MAP, VAP and SEP of the respective basic level context awareness vectors MAV, VAV, SEV (Block 212). The posteriorgrams are of the form $[P(Class^1/Z^K), P(Class^2/Z^K), \ldots, P(Class^L/Z^K)]'$, where L is the number of classes in MAV/VAV/SEV.

Figure 9:
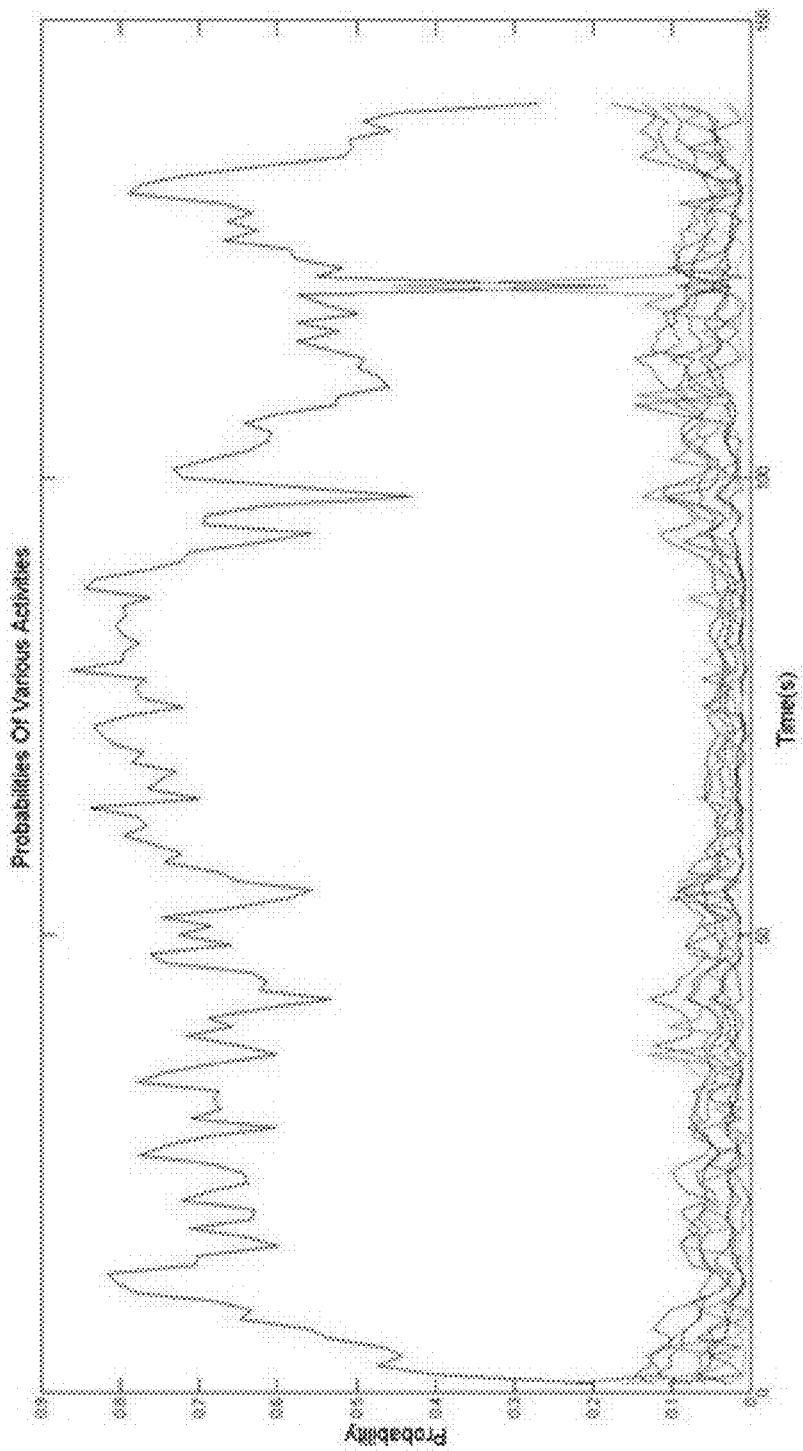
FIG. 9 is a time evolution graph of the motion activity posteriorgram generated using a fusion of accelerometer and pressure sensor data for the activity classified as walking.
Figure 10:
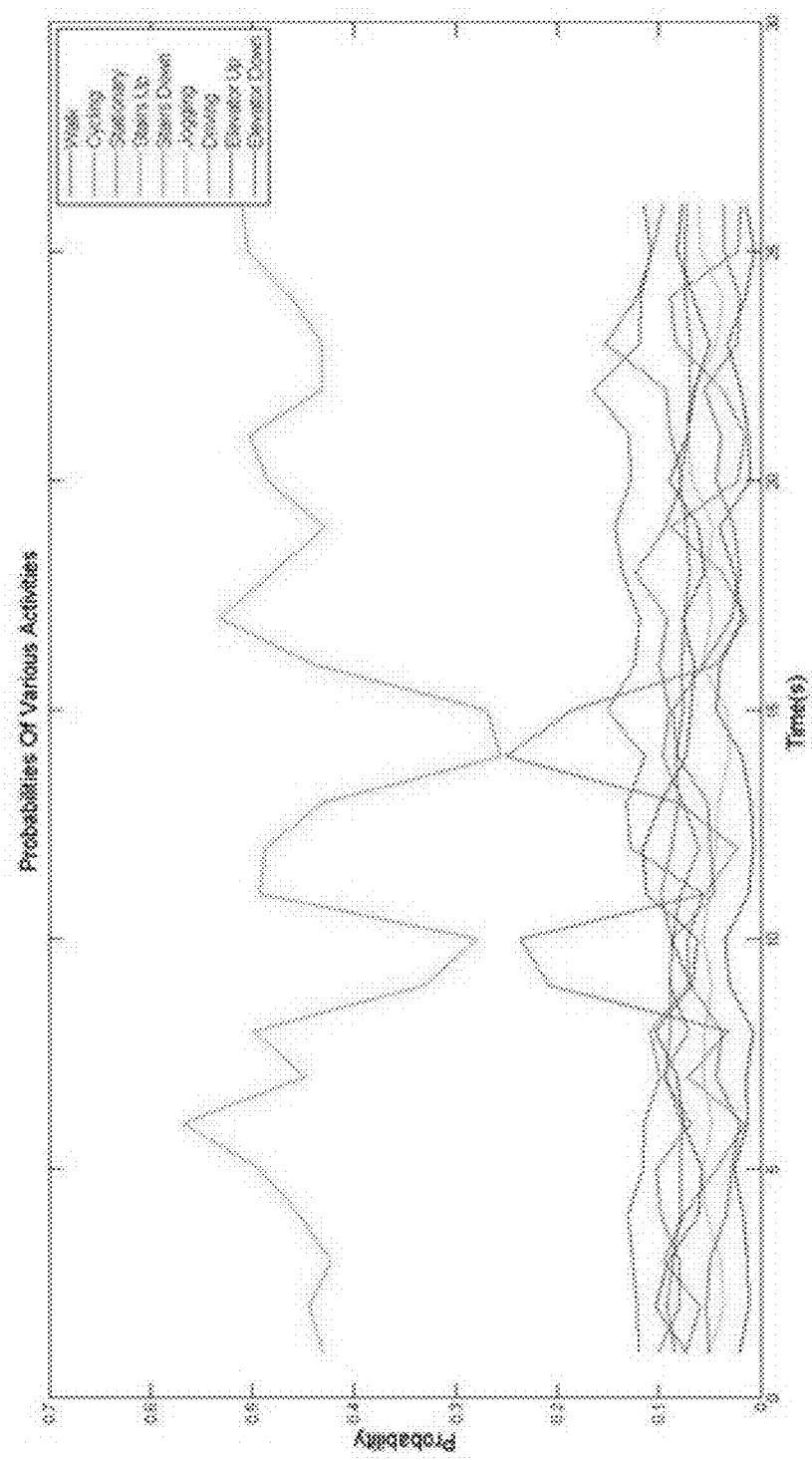
FIG. 10 is a time evolution graph of the motion activity posteriorgram generated using a fusion of accelerometer and pressure sensor data for the activity classified as going upstairs.

FIGS. 9-10 show the MAP using two sensors' data, such as the tri-axial accelerometer and barometer. The 17 features listed above are used from the tri-axial accelerometer and one feature, i.e. the temporal slope of the pressure within the 5 seconds frame estimated using least-squares method are used together in a multi-class probabilistic SVM-DAG model for the 18-dimensional input to obtain the probability of each activity class. Comparing FIG. 6 with FIG. 9, it can be seen that one of the two erroneous decision intervals when only accelerometer data is used is corrected with the fusion of barometer data. The effect of fusion of the accelerometer data with the barometer data is evident in the comparison of FIGS. 6 and 9, respectively, where all the incorrect decisions with the accelerometer sensor data are corrected when it is fused with the barometer data. The additional input from the pressure sensor is able to correctly disambiguate the "going upstairs" activity from "walking" and other activities.

The performance of a motion activity classifier for 9 classes using the probabilistic MAP output is illustrated in FIG. 11 in the form of a confusion matrix. The classification is based on the fusion of 18 features obtained from the accelerometer and the barometer data obtained from a smartphone. The MAP is obtained using the multi-class probabilistic SVM-DAG model that is previously trained on user data. The performance results have been obtained using the leave one out method on 10 subjects' data. The rows in the confusion matrix give the true motion activity classes while the columns give the decoded activity classes. Thus, the diagonal values represent the percentage of correct decisions for the respective classes while the off-diagonal values represent the erroneous decisions. The aggregate percentage of correct decisions is obtained as 95.16% for the 9 motion activity classes.

The single sensor's data and/or multiple sensors' fused data are used to derive the probabilistic outputs regarding the basic level context awareness information. This general algorithmic framework for basic level context awareness is expandable so that it can also include more motion and voice activity classes and spatial environmental contexts in the probabilistic output format as required. The respective posteriorgram outputs can be integrated over time to provide more accurate but delayed decisions regarding the activity or environment classes. The algorithmic framework allows for the integration of additional posteriorgrams for other categories of detection tasks derived from the same sensors or additional sensors.

Figure 12:
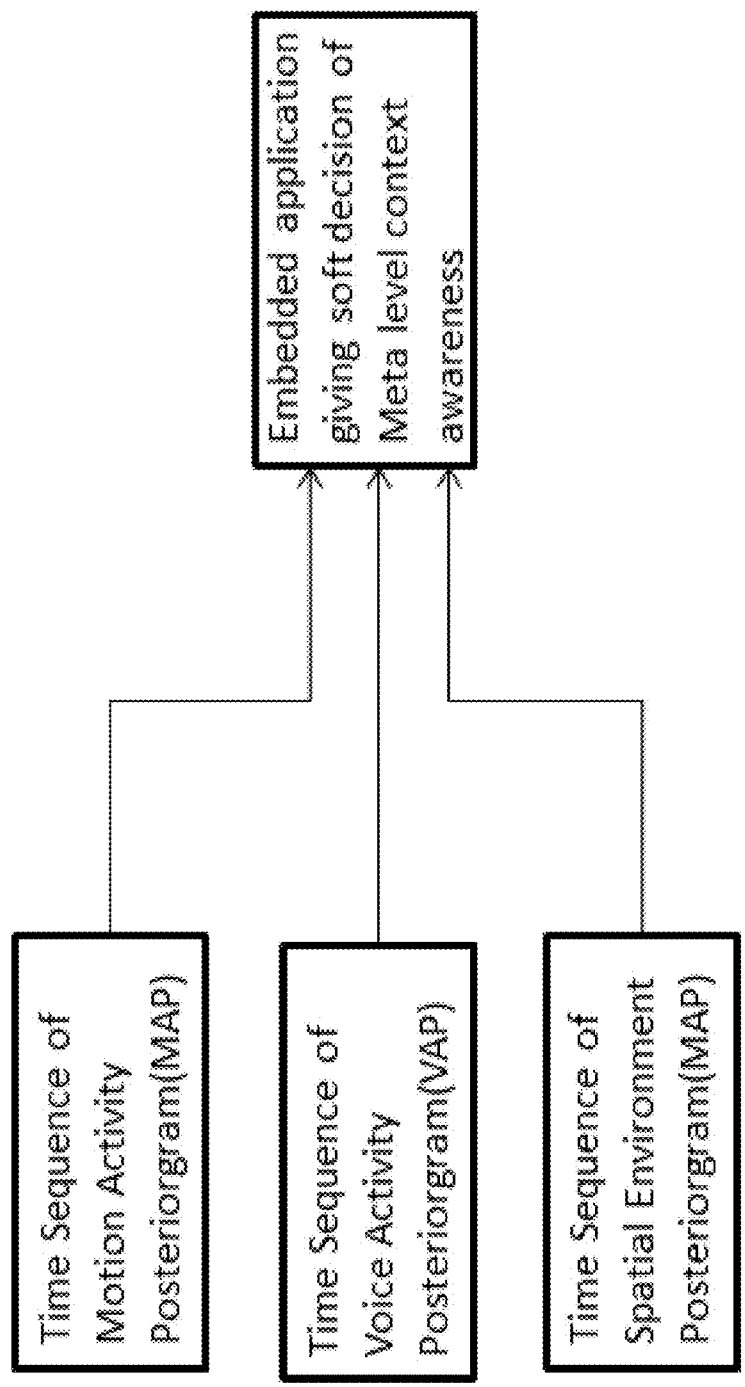
FIG. 12 is a block diagram of a method of embedded application development for meta-level contextual awareness using the motion activity posteriorgram, voice activity posteriorgram, and spatial environment posteriorgram.

The posteriorgram outputs for the motion and voice activities and spatial environment classes can be used to perform meta-level probabilistic analysis and develop embedded applications about context awareness as depicted in FIG. 12. For example, the inference from the MAP as "walking" activity class and the inference from the SEP as the "shopping mall" class can together be used to make a meta-level inference that the user is walking in a shopping mall. The probabilistic information in the three posteriorgrams can be used as input to a meta-level context awareness classifier on which higher-level applications can be built.

Figure 13:
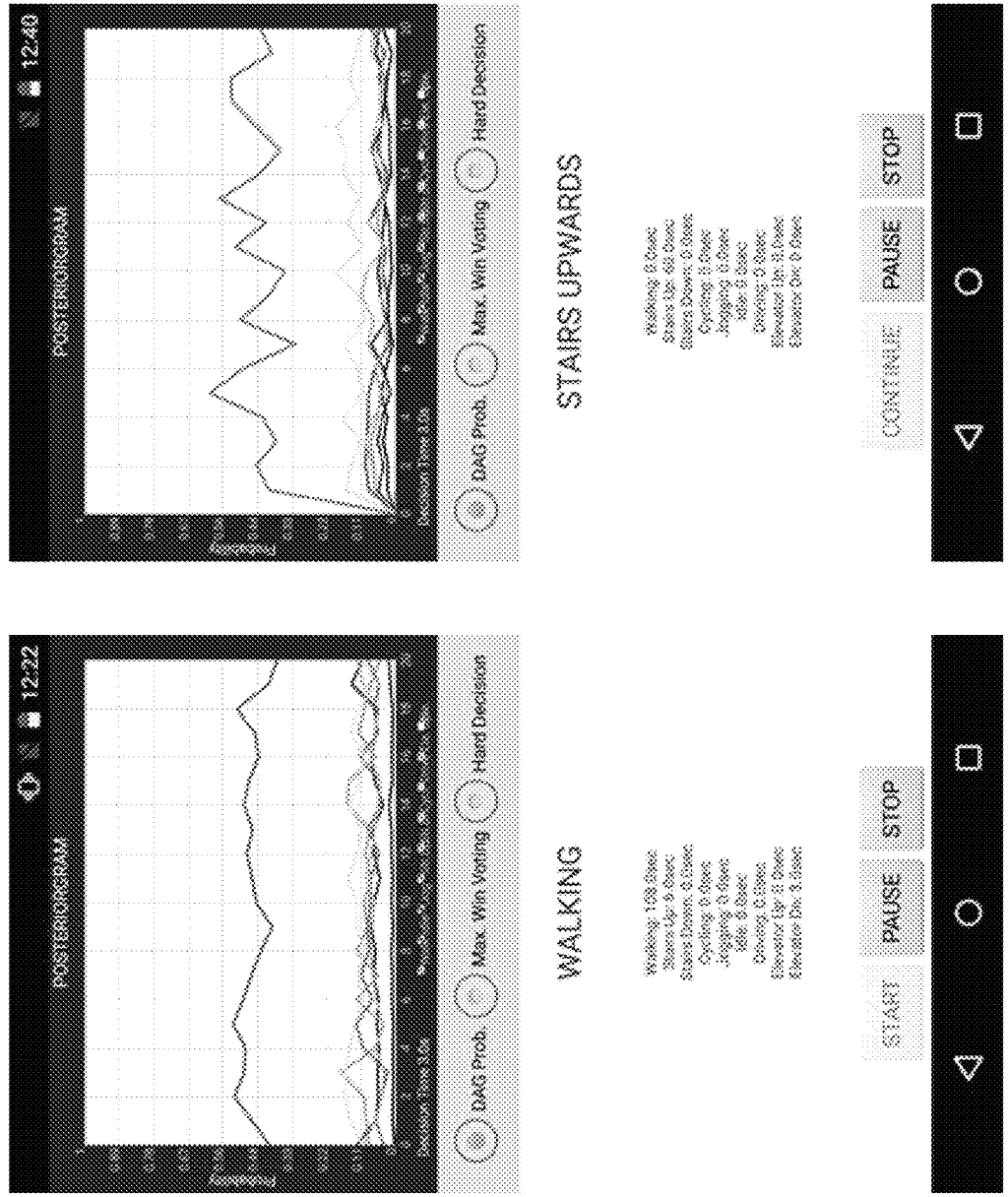
FIG. 13 shows two screen shots of a smartphone application that computes the motion activity posteriorgram and displays its time evolution.

FIG. 13 shows the snapshot of an application developed using Java for an Android OS based smartphone. The user interface of the application includes buttons for Start, Stop, and Pause as shown in the left-side snapshot, for computing in real-time the posteriorgrams, logging their time evolution, and displaying them graphically for up to 40 past frames in real-time. The right-side snapshot displays the MAP for 9 motion activity classes as a function of time. It also displays the current frame's decoded class from the maximum probability value. The total duration that the user spends in each motion activity class since the start of the application is also shown. The application uses fusion of accelerometer, barometer, and gyroscope data to determine the motion activity posteriorgram. Depending up on the number of sensors used, the number of features varies. The posteriorgram is evaluated using one of the following three methods: i) multi-class probabilistic SVM with DAG, ii) multi-class probabilistic SVM with MWV, and iii) multi-class SVM with hard-decision output. The graphical display of the probability values for all the classes in real-time also gives a quick visual depiction of the "confidence" in the classification result as the maximum probability class by comparing with the second highest probability class.

Although the preceding description has been described herein with reference to particular means, materials and embodiments, it is not intended to be limited to the particulars disclosed herein; rather, it extends to all functionally equivalent structures, methods, and uses, such as are within the scope of the appended claims.

The invention claimed is:

1. An electronic device, comprising:
   a sensing unit comprising at least one sensor and being configured to acquire sensing data;
   a computing device configured to:
   extract sensor specific features from the sensing data;
   generate a motion activity vector, a voice activity vector, and a spatial environment vector as a function of the sensor specific features;
   process the motion activity vector, voice activity vector, and spatial environment vector so as to determine a base level context of the electronic device relative to its surroundings, the base level context having a plurality of aspects each based on the motion activity vector, voice activity vector, and spatial environment vector,
   wherein one of the plurality of aspects of the base level context is determined to be a mode of locomotion of a user carrying the electronic device, as a function of the motion activity vector,
   wherein one of the plurality aspects of the base level context is determined to be a nature of biologically generated sounds within audible distance of the user, as a function of the voice activity vector,
   wherein one of the plurality aspects of the base level context is determined to be a nature of physical space around the user, as a function of the spatial environment vector,
   wherein the determined mode of locomotion of the user comprises one of the user being stationary, walking, going up stairs, going down stairs, jogging, cycling, climbing, using a wheelchair, and riding in or on a vehicle, wherein the determined nature of the biologically generated sounds comprises one of a telephone conversation engaged in by the user, a multiple party conversation engaged in by the user, the user speaking, another party speaking, background conversation occurring around the user, and an animal making sounds, wherein the determined nature of the physical space around the user comprises an office environment, a home environment, a shopping mall environment, a street environment, a stadium environment, a restaurant environment, a bar environment, a beach environment, a nature environment, a temperature of the physical space, a barometric pressure of the physical space, and a humidity of the physical space, and determine meta level context of the electronic device relative to its surroundings as a function of the base level context, wherein the meta level context comprises at least one inference made from at least two aspects of the plurality of aspects of the base level context.

2. The electronic device of claim 1, wherein each aspect of the base level context based on the motion activity vector is mutually exclusive of one another; wherein each aspect of the base level context based on the voice activity vector is mutually exclusive of one another; and wherein each aspect of the base level context based on the spatial environment vector is mutually exclusive of one another.

3. The electronic device of claim 1, wherein the plurality of aspects of the base level context consist of one aspect based on the motion activity vector, one aspect based on the voice activity vector, and one aspect based on the spatial environment vector.

4. The electronic device of claim 1, wherein the computing device is further configured to facilitate performance of at least one contextual function of the electronic device as a function of the meta level context of the electronic device.

5. An electronic device, comprising:
a sensing unit comprising at least one sensor and being configured to acquire sensing data;
a computing device configured to:
extract sensor specific features from the sensing data;
generate a motion activity vector, a voice activity vector, and a spatial environment vector as a function of the sensor specific features;
process the motion activity vector, voice activity vector, and spatial environment vector so as to determine a base level context of the electronic device relative to its surroundings, the base level context having a plurality of aspects each based on the motion activity vector, voice activity vector, and spatial environment vector, and
determine meta level context of the electronic device relative to its surroundings as a function of the base level context, wherein the meta level context comprises at least one inference made from at least two aspects of the plurality of aspects of the base level context;
wherein the computing device is configured to process the motion activity vector, voice activity vector, and spatial environment vector by:
generating a motion activity posteriorgram as a function of the motion activity vector, the motion activity posteriorgram representing a probability of each element of the motion activity vector as a function of time;
generating a voice activity posteriorgram as a function of the voice activity vector, the voice activity posteriorgram representing a probability of each element of the voice activity vector as a function of time; and
generating a spatial environment posteriorgram as a function of the spatial environment vector, the spatial environment posteriorgram representing a probability of each element of the spatial environment vector as a function of time.

6. The electronic device of claim 5, wherein a sum of each probability of the motion activity posteriorgram at any given time equals one; wherein a sum of each probability of the voice activity posteriorgram at any given time equals one; and wherein a sum of each probability of the spatial environment posteriorgram at any given time equals one.

7. The electronic device of claim 5, wherein the sensing unit consists essentially of one sensor.

8. The electronic device of claim 5, wherein the sensing unit comprises a plurality of sensors; and wherein the motion activity vector, voice activity vector, and spatial environment vector are generated as a function of a fusion of the sensor specific features.

9. The electronic device of claim 8, wherein the plurality of sensors comprise at least two of an accelerometer, pressure sensor, microphone, gyroscope, magnetometer, GPS unit, and barometer.

10. An electronic device, comprising:
a sensing unit comprising at least one sensor and being configured to acquire sensing data;
a printed circuit board (PCB) having at least one conductive trace thereon;
system on chip (SoC) mounted on the PCB and electrically coupled to the at least one conductive trace; and
a computing device comprising a sensor chip mounted on the PCB in a spaced apart relation with the SoC and electrically coupled to the at least one conductive trace such that the sensor chip and SoC are electrically coupled, wherein the sensor chip comprises an microelectromechanical system (MEMS) sensing unit, and a control circuit configured to
extract sensor specific features from the sensing data;
generate a motion activity vector, a voice activity vector, and a spatial environment vector as a function of the sensor specific features;
process the motion activity vector, voice activity vector, and spatial environment vector so as to determine a base level context of the electronic device relative to its surroundings, the base level context having a plurality of aspects each based on the motion activity vector, voice activity vector, and spatial environment vector, and
determine meta level context of the electronic device relative to its surroundings as a function of the base level context, wherein the meta level context comprises at least one inference made from at least two aspects of the plurality of aspects of the base level context.

11. An electronic device, comprising:
a printed circuit board (PCB) having at least one conductive trace thereon;
a system on chip (SoC) mounted on the PCB and electrically coupled to the at least one conductive trace;
a sensor chip mounted on the PCB in a spaced apart relation with the SoC and electrically coupled to the at least one conductive trace such that the sensor chip and SoC are electrically coupled, and configured to acquire sensing data;

wherein the sensor chip comprises:
a micro-electromechanical system (MEMS) sensing unit;
an embedded processing node configured to:
preprocess the sensing data,
extract sensor specific features from the sensing data,
  generate a motion activity posteriorgram, a voice activity posteriorgram, and a spatial environment posteriorgram as a function of the sensor specific features,
  process the motion activity posteriorgram, voice activity posteriorgram, and spatial environment posterior gram so as to determine a base level context of the electronic device relative to its surroundings, the base level context having a plurality of aspects each based on the motion activity posteriorgram, voice activity posteriorgram, and spatial environment posteriorgram, and
determine meta level context of the electronic device relative to its surroundings as a function of the base level context and a pattern library stored in the cloud or a local memory, wherein the meta level context comprises at least one inference made from at least two aspects of the plurality of aspects of the base level context.

12. The electronic device of claim 11, further comprising at least one additional sensor; wherein the SoC is configured to acquire additional data from the at least one additional sensor; wherein the embedded processing node is further configured to receive the additional data from the SoC and to also extract the sensor specific features from the additional data.

13. The electronic device of claim 11, wherein the embedded processing node is configured to generate the motion activity posteriorgram, voice activity posteriorgram, and spatial environment posteriorgram to represent a probability of each element of a motion activity vector, a voice activity vector, and a spatial environment vector as a function of time, respectively.

14. The electronic device of claim 11, wherein a sum of each probability of the motion activity posteriorgram at any given time equals one; wherein a sum of each probability of the voice activity posteriorgram at any given time equals one; and wherein a sum of each probability of the spatial environment posteriorgram at any given time equals one.

15. The electronic device of claim 11, wherein the sensor chip consists essentially of one MEMS sensing unit.

16. The electronic device of claim 11, wherein the sensor chip comprises a plurality of MEMS sensing units; and wherein the motion activity posteriorgram, voice activity posteriorgram, and spatial environment posteriorgram are generated as a function of a fusion of the sensor specific features.

17. A method, comprising:
acquiring sensing data from a sensing unit;
extracting sensor specific features from the sensing data, using a computing device;
generating a motion activity vector, a voice activity vector, and a spatial environment vector as a function of the sensor specific features, using the computing device;
processing the motion activity vector, voice activity vector, and spatial environment vector so as to determine a base level context of the electronic device relative to its surroundings, the base level context having a plurality of aspects each based on the motion activity vector, voice activity vector, and spatial environment vector, using the computing device; and
determining meta level context of the electronic device relative to its surroundings as a function of the base level context, wherein the meta level context comprises at least one inference made from at least two aspects of the plurality of aspects of the base level context, using the computing device;
wherein the motion activity vector, voice activity vector, and spatial environment vector are processed by:
  generating a motion activity posteriorgram as a function of the motion activity vector, the motion activity posteriorgram representing a probability of each element of the motion activity vector as a function of time;
  generating a voice activity posteriorgram as a function of the voice activity vector, the voice activity posteriorgram representing a probability of each element of the voice activity vector as a function of time; and
  generating a spatial environment posteriorgram as a function of the spatial environment vector, the spatial environment posteriorgram representing a probability of each element of the spatial environment vector as a function of time.

* * * * *